US012589516B2

(12) United States Patent
Nishimura et al.

(10) Patent No.: US 12,589,516 B2
(45) Date of Patent: Mar. 31, 2026

(54) WORKING MACHINE

(71) Applicant: YAMABIKO CORPORATION, Ohme (JP)

(72) Inventors: Atsushi Nishimura, Ohme (JP); Shunsuke Ueda, Ohme (JP); Mindaugas Ambrasas, Ohme (JP)

(73) Assignee: YAMABIKO CORPORATION (JP)

( * ) Notice: Subject to any disclaimer, the term of this patent is extended or adjusted under 35 U.S.C. 154(b) by 0 days.

(21) Appl. No.: 19/053,618

(22) Filed: Feb. 14, 2025

(65) Prior Publication Data

US 2025/0367849 A1 Dec. 4, 2025

(30) Foreign Application Priority Data

Jun. 4, 2024 (JP) ................................ 2024-090737

(51) Int. Cl.
*B27B 17/08* (2006.01)
*B27B 17/10* (2006.01)

(52) U.S. Cl.
CPC ............ *B27B 17/10* (2013.01); *B27B 17/083* (2013.01)

(58) Field of Classification Search
CPC ........ B27B 17/08; B27B 17/083; B25C 1/008
See application file for complete search history.

(56) References Cited

U.S. PATENT DOCUMENTS 3,847,233 A * 11/1974 Glover ..................... H01H 3/20 200/318.2
4,079,708 A * 3/1978 Wieland ................... F02M 1/02 123/376
4,560,040 A * 12/1985 Morner ................... F16D 59/00 192/17 R
4,586,588 A * 5/1986 Nagashima ........... B27B 17/083 188/77 R
4,629,106 A * 12/1986 Howard .................. B25C 1/008 227/8

(Continued)

FOREIGN PATENT DOCUMENTS

CN 208572785 U 3/2019

OTHER PUBLICATIONS

European Search Report issued in the corresponding European Patent Application No. 25157004.0; dated Jul. 30, 2025 (total 8 pages).

*Primary Examiner* — Gloria R Weeks
(74) *Attorney, Agent, or Firm* — Harness, Dickey & Pierce, P.L.C.

(57) ABSTRACT

A working machine is provided that includes a working portion and a main body portion including a main body case, an operation mechanism and a power switch. The operation mechanism includes a trigger lever, a lockout lever, and a restricting portion. The trigger lever includes a trigger lever body, and an operation portion including a projection portion. When an external force toward the main body case is applied to the trigger lever body, the projection portion of the operation portion comes into contact with the restricting portion and the trigger lever body comes into contact with the lockout lever, so that the trigger lever body is prevented from rotating relative to the main body case. When the working machine is viewed from a normal direction of a flat surface while being placed on the flat surface, a rotation center of the trigger lever body overlaps with the power switch.

11 Claims, 10 Drawing Sheets

(56) References Cited

U.S. PATENT DOCUMENTS

| | | | | | |
|---|---|---|---|---|---|
| 4,793,064 | A * | 12/1988 | Nagashima | B23Q 11/0092 188/77 R |
| 6,929,165 | B1 * | 8/2005 | Chen | B25C 1/008 227/8 |
| 7,320,422 | B2 * | 1/2008 | Schell | B25C 5/1665 227/120 |
| 11,654,538 | B2 * | 5/2023 | Knight | B25C 1/047 227/130 |
| 11,691,258 | B2 * | 7/2023 | Ishikawa | B25C 1/047 227/8 |
| 11,786,237 | B2 * | 10/2023 | Baxter, III | A61B 17/07207 227/176.1 |
| 12,064,894 | B2 * | 8/2024 | Schlosser | B23D 57/023 |
| 12,377,573 | B2 * | 8/2025 | Niiyama | B27G 19/003 |
| 2001/0006183 | A1 * | 7/2001 | Mukoyama | B25C 1/008 227/8 |
| 2009/0193669 | A1 * | 8/2009 | Gorenflo | B27B 17/083 30/277.4 |
| 2011/0168422 | A1 | 7/2011 | Fujiwara et al. | |
| 2015/0170848 | A1 * | 6/2015 | Kannan | H01H 3/20 200/43.17 |
| 2015/0352701 | A1 * | 12/2015 | Wu | B25C 1/008 227/8 |
| 2020/0266690 | A1 * | 8/2020 | Agne | H02K 11/28 |
| 2021/0252665 | A1 * | 8/2021 | Petsri | B24B 23/06 |
| 2022/0072732 | A1 * | 3/2022 | Schlosser | B23D 57/023 |
| 2022/0118596 | A1 * | 4/2022 | Hatakeyama | B25F 5/02 |
| 2023/0321806 | A1 * | 10/2023 | McLachlan | H01H 9/06 173/48 |

* cited by examiner

WORKING MACHINE

CROSS REFERENCE TO RELATED APPLICATIONS

The present application claims priority under 35 U.S.C. § 119 to Japanese Patent Application No. 2024-090737, filed Jun. 4, 2024, the contents of which are incorporated herein by reference in their entirety.

BACKGROUND

Technical Field

The present disclosure relates to a working machine.

Related Art

A handheld gardening tool (working machine) used for pruning hedges and plants is known (see CN208572785 U). The handheld gardening tool includes a switching assembly to control its driving and stopping operations.

The switching assembly includes a trigger having an operating surface, and a first operation member switchable between a first position and a second position. The first operation member at least partially protrudes from the operating surface to restrict movement of the trigger when in the first position. The first operation member allows movement of the trigger when in the second position.

In addition, the handheld gardening tool also includes a second operation member that can limit the movement of the trigger. The second operation member is switchable between a third position and a fourth position relative to the trigger and restricts the movement of the trigger when the second operation member is in the third position. When the second operation member is in the fourth position, movement of the trigger is allowed.

Although the trigger, the first operation member and the second operation member are arranged on a single operating lever, it is difficult to operate them simultaneously while holding the operating lever in one hand due to their relative positions.

In view of the above circumstances, a working machine that can be relatively easily operated by unlocking a trigger lever in one hand is provided.

SUMMARY

According to one aspect of the present disclosure, a working machine is provided. The working machine comprises a working portion configured to cut a work object; and a main body portion connected to the working portion. The main body portion includes a main body case, an operation mechanism and a power switch which are provided in the main body case. The operation mechanism includes a trigger lever configured to control actuation of the working portion, a lockout lever provided so as to be displaceable relative to the trigger lever, and a restricting portion that restricts a position of the trigger lever relative to the main body case. The trigger lever includes a trigger lever body rotatably attached to the main body case, and an operation portion provided so as to be displaceable relative to the trigger lever body and including a projection portion positioned inside the main body case. When an external force toward the main body case is applied to the trigger lever body that protrudes from the main body case and is in an initial position before the external force is applied, the projection portion of the operation portion comes into contact with the restricting portion and the trigger lever body comes into contact with the lockout lever, so that the trigger lever body is configured to be prevented from rotating relative to the main body case. When the working machine is viewed from a normal direction of a flat surface while being placed on the flat surface, a rotation center of the trigger lever body overlaps with the power switch.

According to such an aspect, it is possible to relatively easily operate a working machine by unlocking a trigger lever in one hand.

DETAILED DESCRIPTION

Hereinafter, an embodiment of a chainsaw, which is an example of a working machine, will be described using the attached drawings. Various features described in the embodiment below can be combined with each other.

Figure 1:
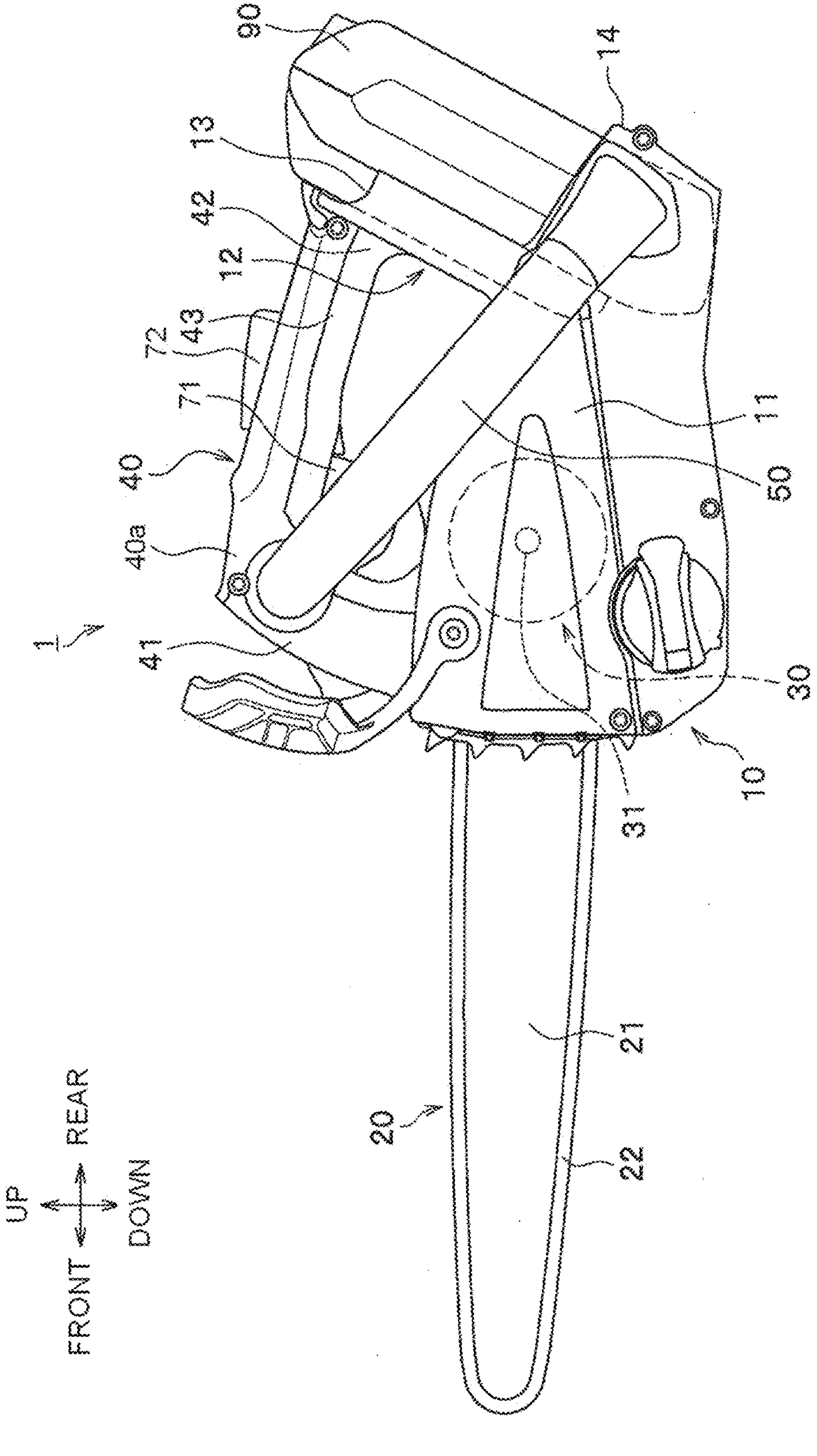
FIG. 1 is a left side view of a chainsaw.
Figure 2:
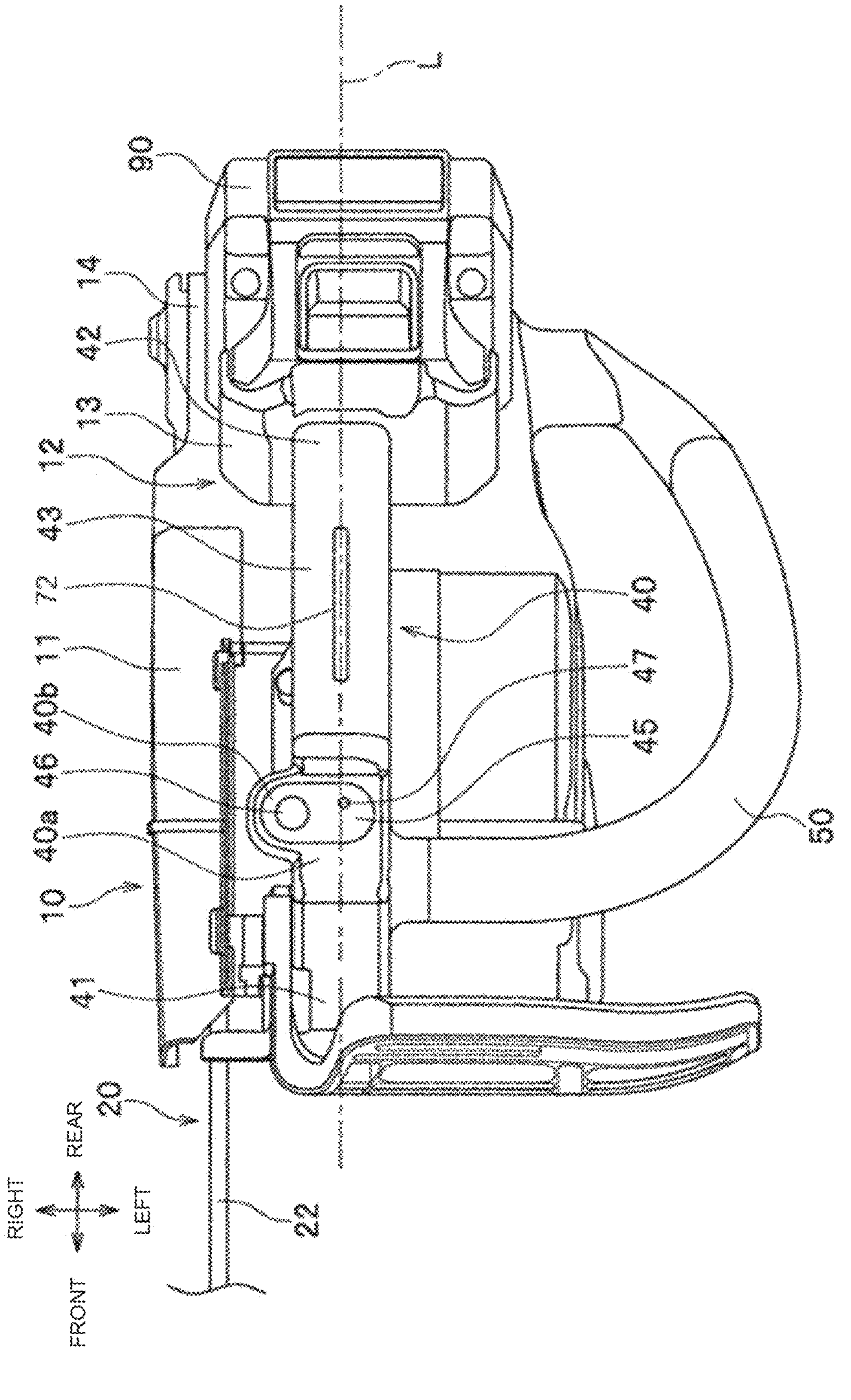
FIG. 2 is a top view of a chainsaw.
Figure 3:
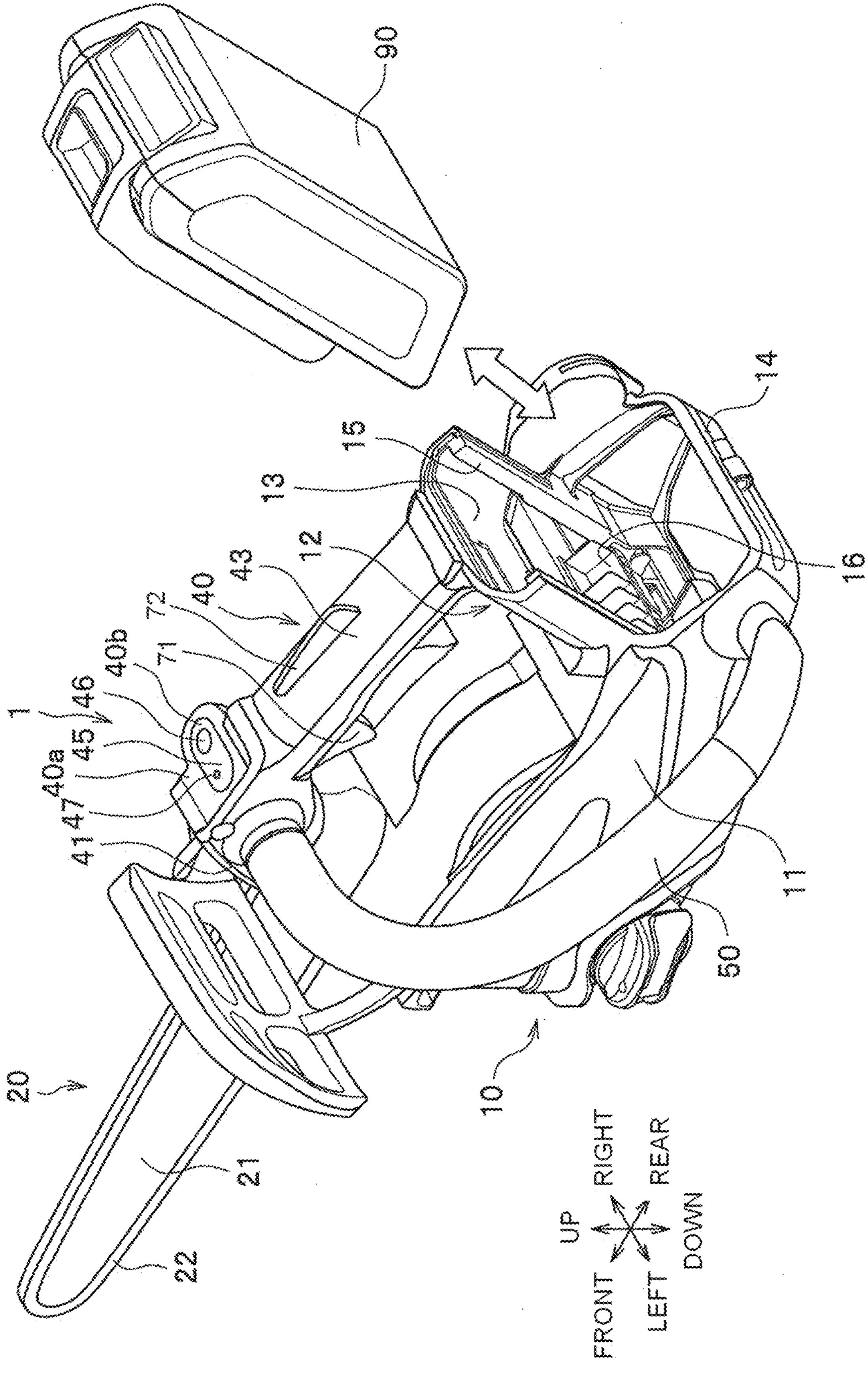
FIG. 3 is a perspective view of a chainsaw.
Figure 4:
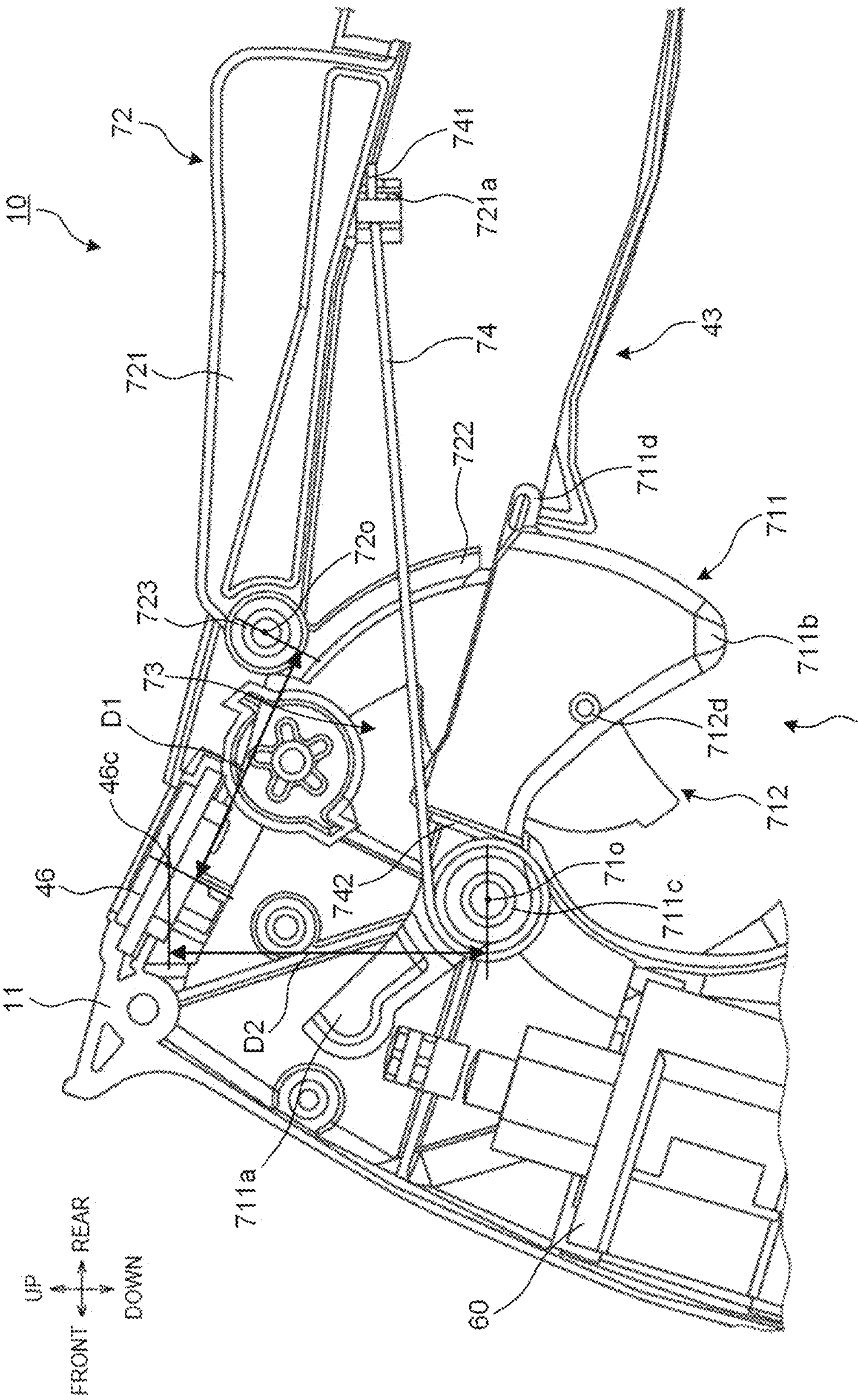
FIG. 4 is a side view showing a main body portion with a left cover removed.
Figure 5:
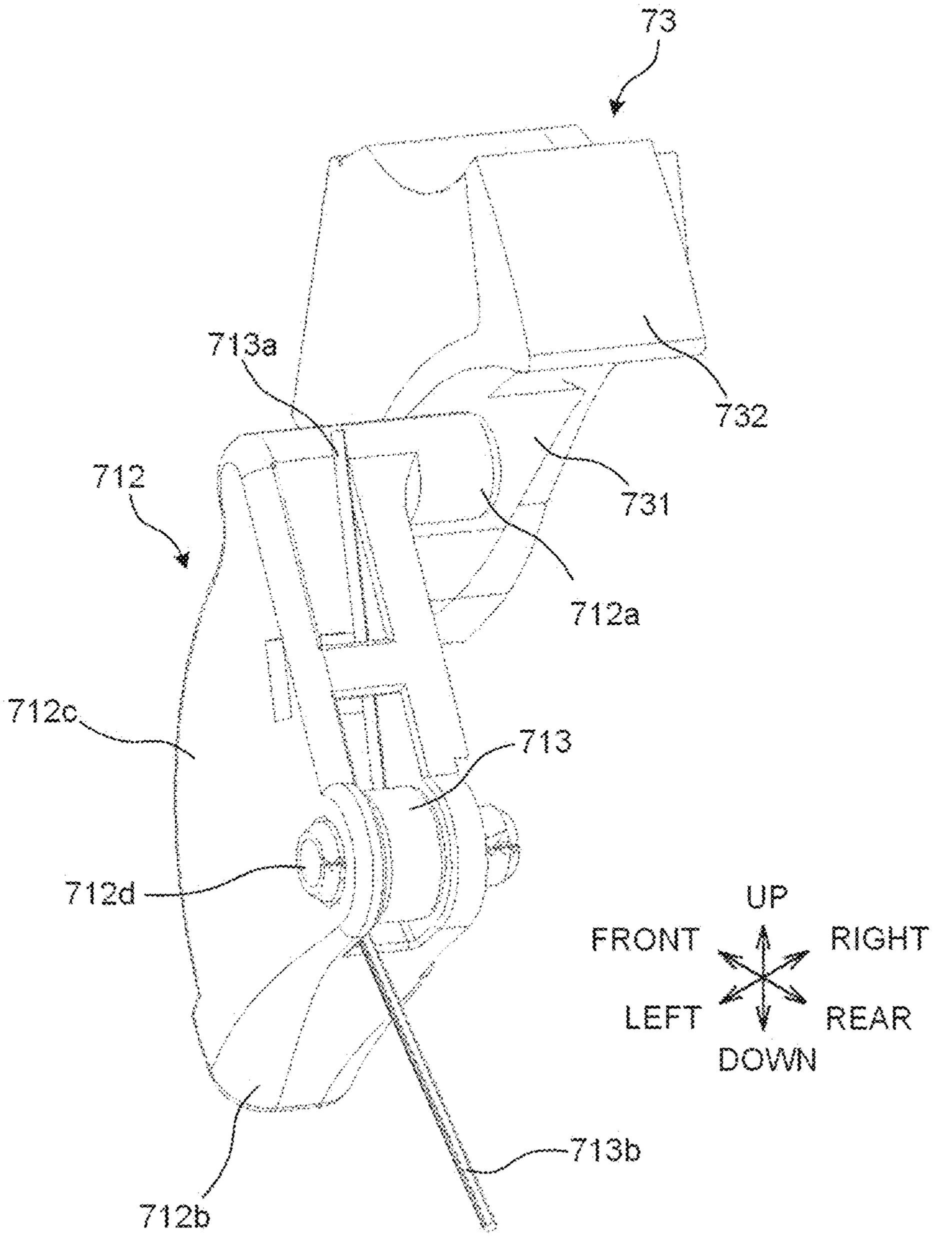
FIG. 5 is a perspective view showing a relationship between a restricting portion and an operation portion.

FIG. 1 is a left side view of a chainsaw. FIG. 2 is a top view of the chainsaw. FIG. 3 is a perspective view of the chainsaw. FIG. 4 is a side view showing a main body portion with a left cover removed. FIG. 5 is a perspective view showing a relationship between a restricting portion and an operation portion. FIG. 6 to FIG. 10 show the states of an operation mechanism, respectively.

Note that directions of each component configuring the chainsaw are defined based on "up and down", "left and right", and "front and rear" shown in the drawings.

A chainsaw 1 shown in FIG. 1 is a small chainsaw referred to as a top-handle saw. The chainsaw (working machine) 1 includes a working portion 20 configured to cut a work object and a main body portion 10 connected to the working portion 20.

The main body portion 10 includes a main body case 11, in which a motor 30 and a detachable battery 90 are mounted. The working portion 20 is driven by power being supplied from the battery 90 to the motor 30. It should be noted that a small and lightweight internal combustion engine can be installed as a motor instead of the motor 30, and in this case, a fuel tank is installed instead of the battery 90.

In the illustrated configuration, the working portion 20 is a chain cutter. The chain cutter includes a guide bar 21 and a saw chain 22.

The guide bar 21 is a plate-shaped member extending in a front-rear direction, and the rear end of the guide bar 21 is attached to the right front part of the main body portion 10 as shown in FIG. 2.

The annular saw chain 22 is wound around the periphery of the guide bar 21. The rear end of the saw chain 22 is engaged with a drive gear connected to an output shaft 31 of the motor 30.

When the motor 30 is driven to rotate the drive gear (not shown), the saw chain 22 is configured to rotate along the periphery of the guide bar 21.

The main body case 11 is a housing made of resin. A top handle 40 is integrally formed at the top part of the main body case 11. Furthermore, a lateral handle 50 is attached to the left side surface of the main body case 11. An operator can perform work by holding the top handle 40 and the lateral handle 50 with each hand.

As shown in FIG. 1, the motor 30 is housed in the front part of the main body case 11. The motor 30 is a known electric motor. The output shaft 31 of the motor 30 extends in the left-right direction (from the front to the rear of the paper surface).

The front part of the main body case 11 houses, in addition to the motor 30, a control board (not shown) that controls the drive of the motor 30 and a drive mechanism such as a drive gear (not shown) connected to the output shaft 31 of the motor 30.

On the other hand, a battery detachable portion 12 from which the battery 90 is detachable is provided at the rear part of the main body case 11. The battery detachable portion 12 is formed on the rear end surface of the main body portion 10. This battery detachable portion 12 includes a holding portion 13 that holds the battery 90 and a battery case 14 in which the lower part of the battery 90 is housed.

The holding portion 13 is formed at the rear end of the main body case 11 and at a plate-like portion extending upward from the rear end of the main body case 11. The holding portion 13 is inclined so that the lower part is positioned more forward than the upper part, as shown in FIG. 3.

The holding portion 13 is provided with a detachable mechanism 15 for attaching and detaching the battery 90. The detachable mechanism 15 includes a guide member into which the battery 90 is fitted in the vertical direction and a support member (not shown) that supports the battery 90 from below.

When attaching the battery 90 to the holding portion 13, the battery 90 can be attached to the holding portion 13 as shown in FIG. 1 by sliding the battery 90 downward relative to the detachable mechanism 15.

The battery 90 is a known battery and is configured by housing a secondary battery such as a lithium ion secondary battery, in a vertically extending rectangular parallelepiped case, as shown in FIG. 3.

The height of the battery 90 is greater than the height of the rear end of the main body case 11, as shown in FIG. 1. The battery 90 is larger in size than the type of battery that can be housed in the main body case 11. The battery 90 then has a sufficiently high output and charging capacity suitable for the work.

With the battery 90 attached to the holding portion 13, the longitudinal direction of the battery 90 is positioned in the height direction of the main body case 11. The upper end of the battery 90 attached to the holding portion 13 protrudes upward beyond the rear end of the top handle 40.

The holding portion 13 is provided with an eject mechanism (not shown) for detaching the battery 90 from the battery detachable portion 12. With the battery 90 attached to the holding portion 13, the lever provided on the upper part of the battery 90 is operated to actuate the eject mechanism, thereby pushing up the battery 90.

As shown in FIG. 3, a metal connection terminal 16 is provided on the rear end surface of the holding portion 13. The connection terminal 16 is electrically connected to the control board and the motor 30 (see FIG. 1). Then, by connecting the connection terminal of the battery 90 to the connection terminal 16 of the holding portion 13, power is supplied from the battery 90 to the control board and the motor 30.

The battery case 14 is formed at the lower end of the battery detachable portion 12, as shown in FIG. 1. The battery case 14 is a cylindrical portion in which the lower part of the battery 90 is housed. The lower part of the battery 90 is inserted into the battery case 14.

As shown in FIG. 1, the top handle 40 is continuously formed on the top surface of the main body case 11 and extends in the front-rear direction above the main body case 11.

The front end of the top handle 40 protrudes upwardly from the front end of the top surface of the main body case 11. As shown in FIG. 4, a drive switch 60 is provided inside the front end 41 of the top handle 40. The drive switch 60 controls actuation of the working portion 20. Specifically, the drive switch 60 controls the rotation speed of the motor 30 according to the push-in amount of its head, thereby increasing or decreasing the rotation speed of the saw chain 22.

On the other hand, the rear end 42 of the top handle 40 is connected to the upper end of the holding portion 13 of the battery detachable portion 12. With the battery 90 attached to the holding portion 13, the upper end of the battery 90 protrudes upward beyond the rear end of the top handle 40.

A grip 43 extending in the front-rear direction is provided between the front end 41 and the rear end 42 of the top handle 40. The grip 43 is inclined slightly downward from the front end 41 to the rear end 42 of the top handle 40.

The grip 43 is a portion that an operator grips when holding the chainsaw 1. The operator's hand is inserted into the space between the grip 43 and the top surface of the main body case 11.

A trigger lever 71 is provided on the lower surface of the front end of the grip 43 as an operating means for increasing or decreasing the rotation speed of the saw chain 22. That is, the trigger lever 71 is configured to control the actuation of the working portion 20 via the drive switch 60. The operator can operate the trigger lever 71 while gripping the grip 43.

On the other hand, a lockout lever 72 is provided on the top surface of the grip 43 so as to be displaceable relative to the trigger lever 71. Specifically, the lockout lever 72 is arranged so as to be able to protrude from and retract into the grip 43 (main body case 11). When the operator grips the grip 43, the lockout lever 72 is pushed by his/her palm and retracts into the grip 43. This allows the lockout lever 72 and the trigger lever 71 to be operatively connected in the grip 43 so that the trigger lever 71 can be operated for the first time.

In addition, a restricting portion 73 that restricts the position of the trigger lever 71 relative to the grip 43 (main body case 11) is provided on the inside of the grip 43.

In the present embodiment, an operation mechanism 70 is configured by the trigger lever 71, the lockout lever 72, and the restricting portion 73, all of which are provided in the grip 43 (main body case 11). By operating the operation mechanism 70, the actuation of the working portion 20 can be controlled, i.e., the rotation speed of the saw chain 22 can be increased or decreased.

As shown in FIG. 3, the lateral handle 50 extends in the front-rear direction from the front end to the rear end of the left side surface of the main body case 11. The lateral handle 50 may be made of resin or may be formed by bending a lightweight metal pipe.

The front end of the lateral handle 50 is attached to the left side surface of the front end 41 of the top handle 40. The rear end of the lateral handle 50 is arranged behind and below the output shaft 31 of the motor 30 and is attached to the left side wall of the battery case 14.

The portion between the front end and the rear end of the lateral handle 50 is curved so as to bulge outwardly from the left side surface of the main body case 11 (see FIG. 2).

As shown in FIG. 2, in the chainsaw 1 of the present embodiment, a thumb rest 45, a power switch 46, and an indication lamp 47 are provided on the top surface of the front end 41 of the top handle 40. That is, the power switch 46 is provided on the grip 43 (main body case 11).

The thumb rest 45, the power switch 46 and the indication lamp 47 are provided on a recessed surface 40*a* formed on the top surface of the top handle 40. The recessed surface 40*a* is slightly recessed from the upper end surface of the grip 43 (see FIG. 1). In addition, a protruding portion 40*b* that protrudes to the right side from the right side surface of the grip 43 is formed on the recessed surface 40*a*.

The thumb rest 45 is an area on which the ball of the thumb of the right hand is placed when the operator grips the grip 43 with his/her right hand. The thumb rest 45 is positioned on an axial line L in the front-rear direction that passes through the center of the grip 43 in the left-right direction.

The power switch 46 is a push button switch that enables the motor 30 (see FIG. 1) to be driven in a state where it is on and that stops driving of the motor 30 in a state where it is off. The power switch 46 is formed in a circular shape in a plan view and protrudes slightly from the recessed surface 40*a* (not shown). The power switch 46 switches between on and off each time it is pressed.

When the power switch 46 is pressed to be turned on while the drive of the motor 30 is stopped, power is supplied from the battery 90 to the control board (not shown), and the motor 30 is put into a standby state for being driven. When the trigger lever 71 is pulled while the lockout lever 72 is pressed-in, power is supplied from the battery 90 to the motor 30 through the control board, and the motor 30 is driven.

When the power switch 46 is pressed to be turned off while the motor 30 is being driven, the power supply to the motor 30 is cut off, and the drive of the motor 30 is stopped.

The power switch 46 is provided on the right side of the thumb rest 45. The power switch 46 is arranged on the protruding portion 40*b* of the recessed surface 40*a*. Thus, the power switch 46 is arranged at a position protruding to the opposite side (right side) of the lateral handle 50 side (left side) relative to the top handle 40.

The indication lamp 47 is preferably configured by an LED (light emitting diode) lamp provided on the thumb rest 45. The indication lamp 47 indicates the on/off state of the power switch 46. That is, the indication lamp 47 is turned on when the power switch 46 is on and is turned off when the power switch 46 is off.

Next, the configuration of the operation mechanism 70 will be described in detail with reference to FIG. 4 through FIG. 10.

As described above, the operation mechanism 70 includes the trigger lever 71, the lockout lever 72, and the restricting portion 73.

The trigger lever 71 includes a trigger lever body 711 rotatably attached to the grip 43 (main body case 11), and an operation portion 712 provided so as to be displaceable relative to the trigger lever body 711 and including a projection portion 712*a* positioned inside the grip 43 (main body case 11).

In the present embodiment, the operation portion 712 is rotatably attached to the trigger lever body 711.

Figure 6:
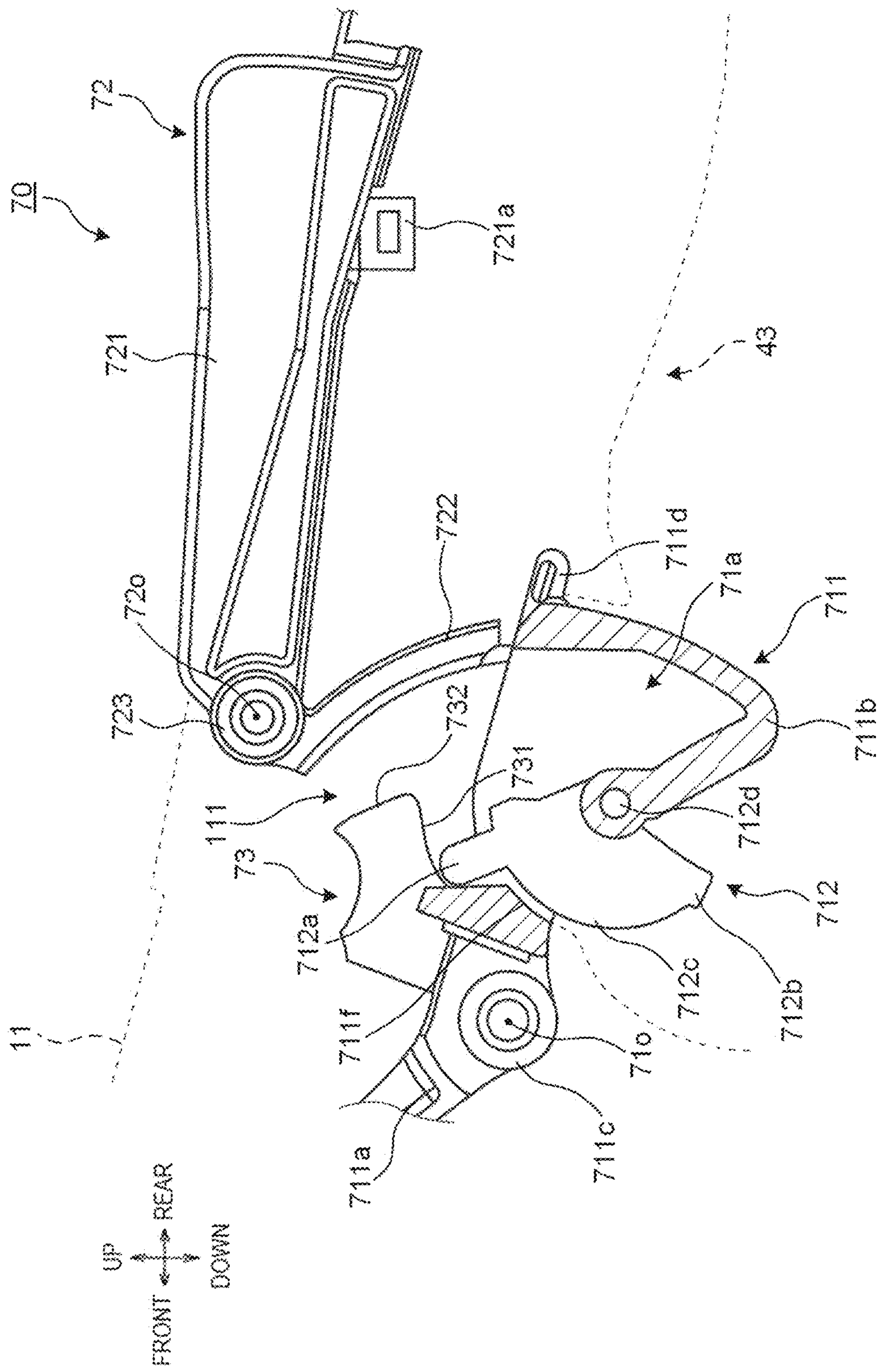
FIG. 6 shows a state of an operation mechanism.

The trigger lever body 711 includes a recessed portion 71*a* that opens upward, as shown in FIG. 6. The recessed portion 71*a* is configured to house the operation portion 712 and to allow a part of the lockout lever 72 (leg portion 722 described later) to be inserted.

The trigger lever 71: further includes a torsion spring 713 attached to the rotary shaft 712*d* of the operation portion 712, as shown in FIG. 5. The torsion spring 713 has one end portion 713*a* that presses the operation portion 712 and the other end portion 713*b* that presses the front inner surface of the recessed portion 71*a* of the trigger lever body 711. The torsion spring 713 biases the operation portion 712 in a direction that causes it to protrude from the trigger lever body 711 (counterclockwise in FIG. 4).

As shown in FIG. 4, the trigger lever body 711 includes a front portion 711*a*, a rear portion 711*b* provided with the recessed portion 71*a*, and a rotary shaft 711*c* provided at the connecting portion between these.

The front portion 711*a* is a portion that comes into contact with the head of the drive switch 60 and presses it downward when the trigger lever body 711 rotates counterclockwise. On the other hand, the rear portion 711*b* is a portion on which the index finger and/or middle finger are hooked to rotate the trigger lever body 711 counterclockwise.

As shown in FIG. 4, a torsion spring 74 is attached to the rotary shaft 711*c* of the trigger lever body 711. The torsion spring 74 has one end portion 741 fixed to the lockout lever 72, and the other end portion 742 fixed to the front end of the rear portion 711*b* of the trigger lever body 711.

The torsion spring 74 biases the lockout lever 72 in a direction (upward) away from the trigger lever 71 and biases the trigger lever body 711 in a direction (clockwise) protruding from the main body case 11.

A locking portion 711*d* protrudes from the rear end of the trigger lever body 711. This locking portion 711*d* is locked to the main body case 11, thereby preventing the trigger lever body 711 from unnecessarily protruding (detaching) from the main body case 11.

The positions shown in FIG. 4 and FIG. 6 are the initial positions (hereinafter referred to as the "initial position") where the trigger lever 71 (trigger lever body 711) protrudes from the main body case 11 and before any external force is applied.

The lockout lever 72 includes a long lockout lever body 721, an arc-shaped leg portion (contact portion) 722 connected to the lockout lever body 721 so as to extend toward the trigger lever 71, and a rotary shaft 723 provided at the connecting portion between the lockout lever body 721 and the leg portion 722. In other words, the lockout lever 72 is attached to the main body case 11 with the connecting portion between the lockout lever body 721 and the leg portion (contact portion) 722 as a rotation center 72*o*.

A fixing portion 721*a* for fixing one end 741 of the torsion spring 74 is provided on the lower surface of the rear end of the lockout lever body 721.

As shown in FIG. 5 and FIG. 6, the restricting portion 73 is provided on the inner surface of the right-side main body case 11. The restricting portion 73 includes a lower surface 731 (a surface on the side of the trigger lever 71) and a rear end surface 732 that is continuous with the lower surface 731 and extends upward.

Here, the state shown in FIG. 6 is a state in which the trigger lever body 711 (trigger lever 71) is in the initial position, and the lockout lever body 721 (lockout lever 72) protrudes most from the main body case 11. From this state, when an upward external force is applied to the trigger lever body 711 (rear portion 711*b*) against the main body case 11 (for example, when the trigger lever body 711 is gripped with the index finger and/or a middle finger), the projection portion 712*a* of the operation portion 712 comes into contact with the restricting portion 73 (lower surface 731) and the trigger lever body 711 comes into contact with the lockout lever 72 (leg portion 722).

Accordingly, the trigger lever body 711 is configured to be prevented from rotating relative to the main body case 11. With such a configuration, when the trigger lever body 711 is in the initial position, the rotation of the trigger lever body 711 relative to the main body case 11 is prevented at two points, thereby making it possible to preferably prevent unintentional operation of the trigger lever body 711.

Furthermore, the main body case 11 includes a housing space 111 capable of housing the projection portion 712*a* of the operation portion 712, between the restricting portion 73 (rear end surface 732) and the lockout lever 72 (leg portion 722).

Figure 7:
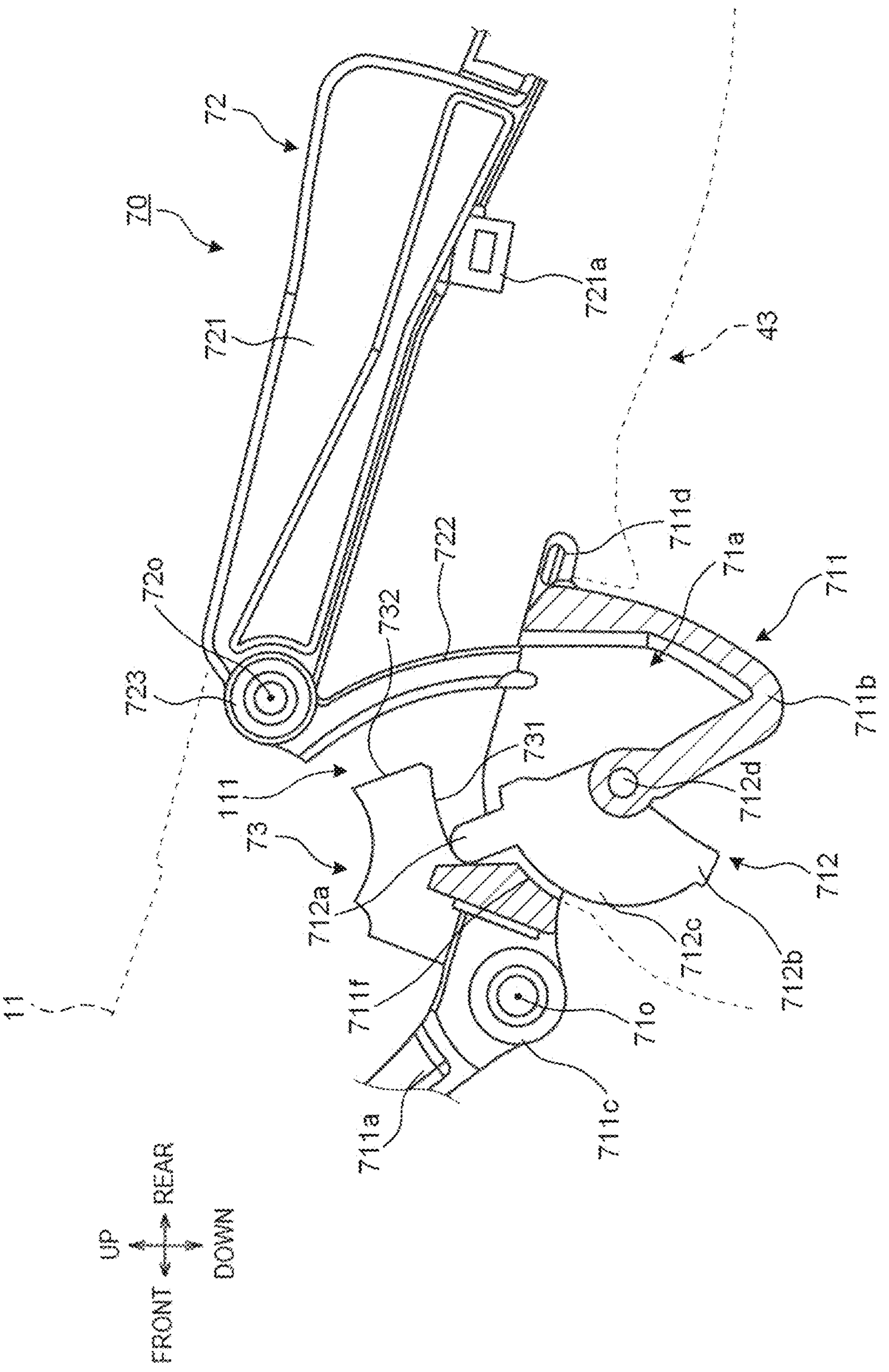
FIG. 7 shows a state of an operation mechanism.

As shown in FIG. 7, when the operator grips the grip 43 with his/her hand and rotates the lockout lever 72 with his/her palm so as to retract it into the grip 43, the leg portion 722 comes to be positioned above the recessed portion 71*a* of the trigger lever body 711. However, in this state, even if the trigger lever body 711 is gripped with, for example, the index finger and/or the middle finger, the projection portion 712*a* of the operation portion 712 contacts the restricting portion 73 (lower surface 731). Thus, the trigger lever body 711 is still prevented from rotating relative to the main body case 11 (i.e., the rotation is locked).

Figure 8:
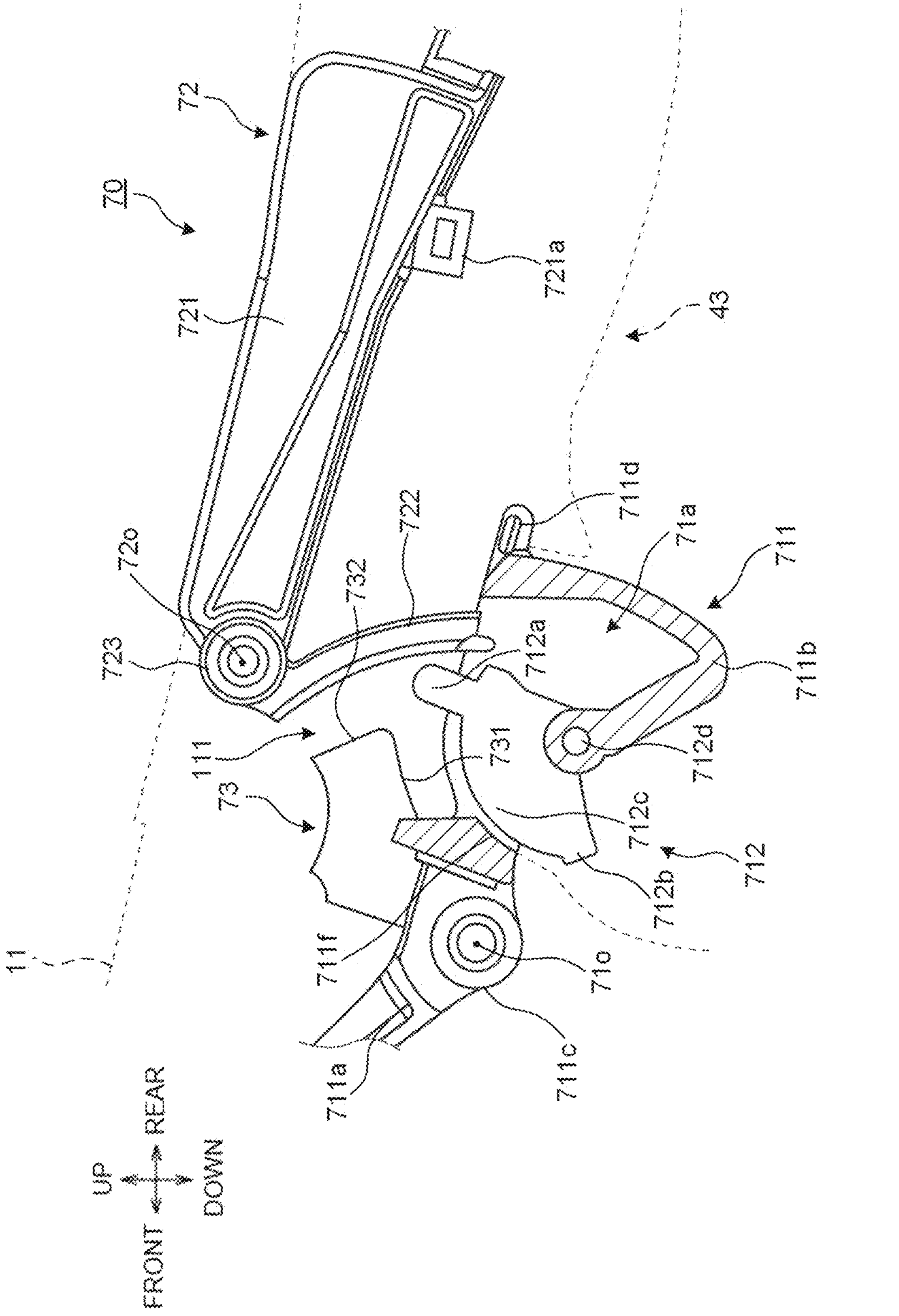
FIG. 8 shows a state of an operation mechanism.

Then, for example, by rotating the operation portion 712 clockwise with the index finger and positioning the projection portion 712*a* behind the lower surface 731 of the restricting portion 73 (below the housing space 111) as shown in FIG. 8, the projection portion 712*a* and the lower surface 731 no longer interfere with each other. As a result, the trigger lever body 711 is allowed to rotate relative to the main body case 11 (i.e., the lock against rotation is released).

Figure 9:
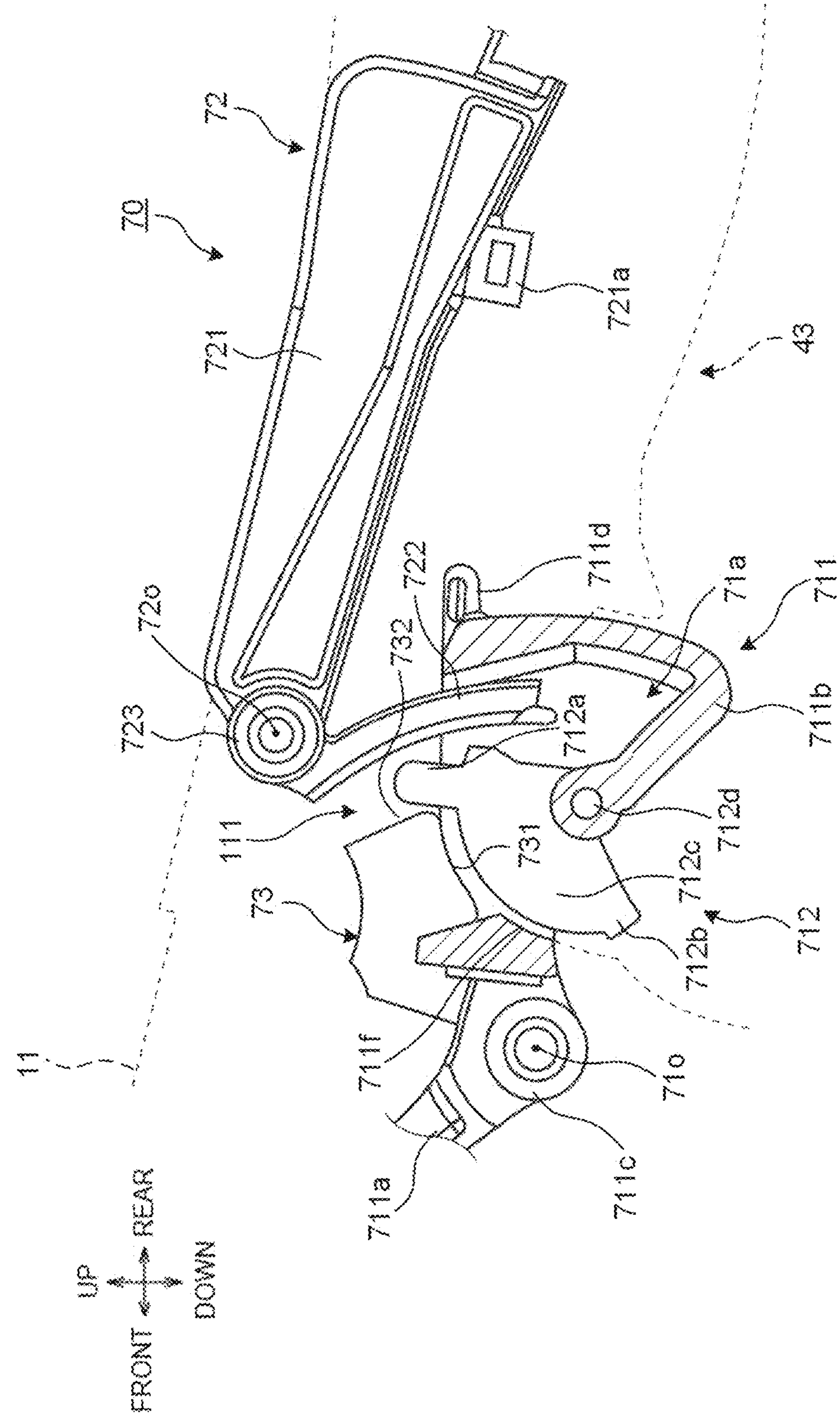
FIG. 9 shows a state of an operation mechanism.

In this state, for example, when the trigger lever body 711 is gripped with the index finger and middle finger, the leg portion 722 of the lockout lever 72 is inserted into the recessed portion 71*a* of the trigger lever body 711, as shown in FIG. 9. In addition, the projection portion 712*a* of the operation portion 712 passes between the restricting portion 73 (rear end surface 732) and the leg portion 722 of the lockout lever 72 and moves toward the housing space 111.

Figure 10:
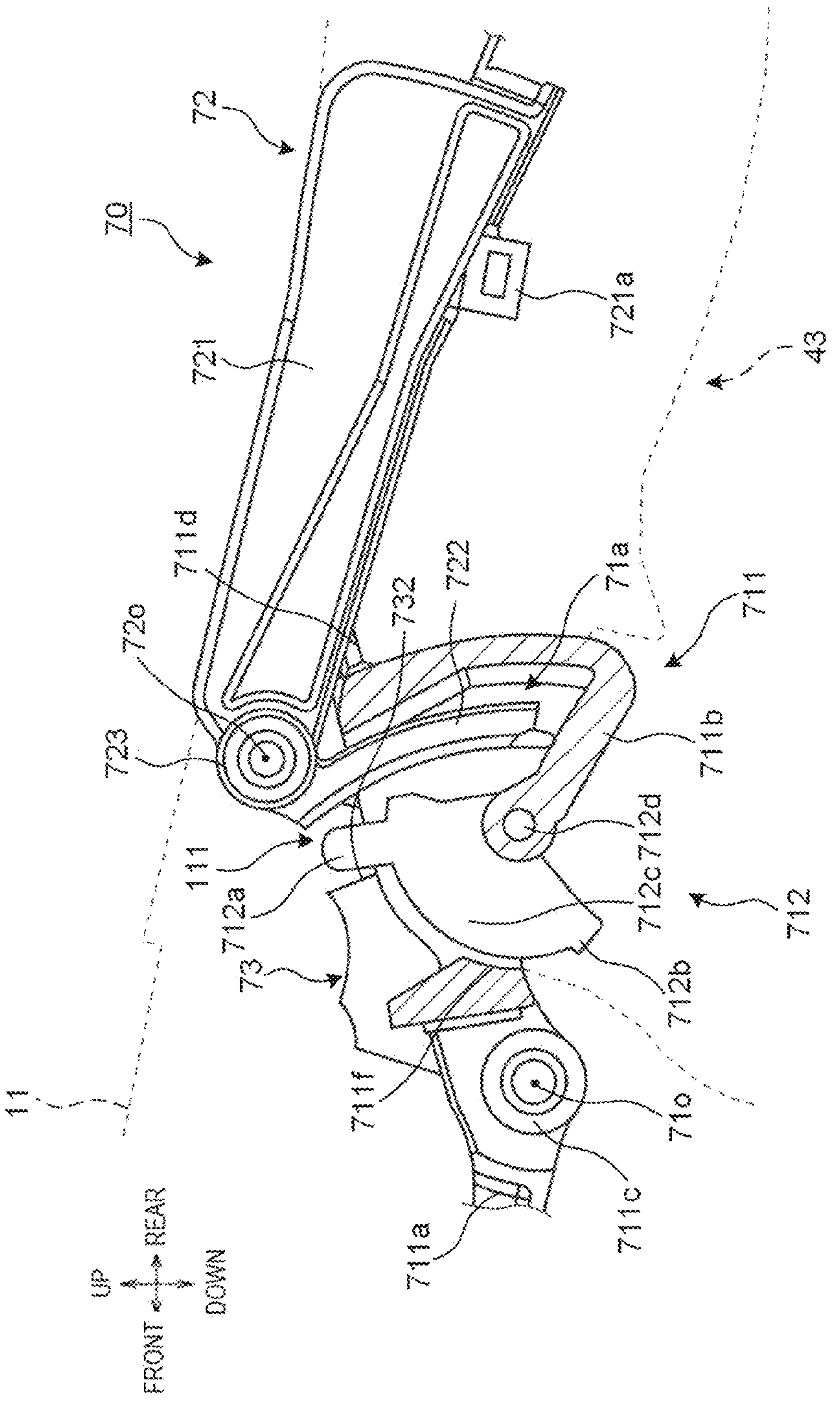
FIG. 10 shows a state of an operation mechanism.

At this time, the front portion 711*a* of the trigger lever body 711 also rotates counterclockwise around the rotary shaft 711*c*, thereby gradually pressing the head of the drive switch 60. This can increase the rotation speed of the saw chain 22. Finally, as shown in FIG. 10, the trigger lever 71 and the lockout lever 72 come closest to each other. At this time, the head of the drive switch 60 is maximally pushed into by the front portion 711*a* of the trigger lever body 711, and the rotation speed of the saw chain 22 becomes maximum.

Thus, by changing the degree of gripping force (external force applied) on the trigger lever body 711, the rotation speed of the saw chain 22 can be adjusted. With such a configuration, two actions are required to release the locked state of the rotation of the trigger lever body 711 relative to the main body case 11 due to the lockout lever 72 and the operation portion 712. Thus, unintended rotation of the saw chain 22 can be prevented more reliably.

When the operation portion 712 is further rotated clockwise relative to the trigger lever body 711 from the state shown in FIG. 8, the projection portion 712*a* comes into contact with the leg portion 722 of the lockout lever 72, preventing further clockwise rotation. At this time, when the trigger lever body 711 is gripped, the projection portion 712*a* can be moved toward the housing space 111 along the leg portion 722. That is, in a state where the lockout lever 72 is brought close to the trigger lever 71, a part of the lockout lever 72 (leg portion 722) can serve as a guiding portion that guides the projection portion 712*a* of the operation portion 712 into the housing space 111. In this case, the trigger lever body 711 can be rotated more accurately relative to the main body case 11. That is, the saw chain 22 can be rotated more accurately and safely.

The lower surface (the surface on the side of the trigger lever 71) 731 of the restricting portion 73 has an arc-shaped curved recessed surface. With this configuration, the projection portion 712*a* can be moved smoothly along the lower surface 731 when the operation portion 712 of the trigger lever 71 is rotated clockwise.

Furthermore, the top of the projection portion 712*a* of the operation portion 712 has a semicircular curved projected surface. This configuration allows the projection portion 712*a* to move more smoothly along the lower surface 731.

The boundary between the lower surface 731 and the rear end surface 732 has a rounded corner (R-shaped corner). In this case, when the projection portion 712*a* of the operation portion 712 is moved from a position where it contacts the lower surface 731 to a position behind the rear end surface 732, it is possible to prevent the projection portion 712*a* from being caught on the corner of the restricting portion 73.

The operation portion 712 further includes a finger hook portion 712*b* and an arc projecting reinforcement portion 712*c*. The finger hook portion 712*b* is a portion that rotates the operation portion 712 relative to the trigger lever body 711. The reinforcement portion 712*c* is provided between the finger hook portion 712*b* and the projection portion 712*a*. A portion 711*f* of the trigger lever body 711 opposite to the reinforcement portion 712*c* also has an arc recessed shape corresponding to the shape of the reinforcement portion 712*c*. With this configuration, the mechanical strength of the operation portion 712 can be improved, while clogging of the gap between the operation portion 712 and the trigger lever body 711 with chips or the like can be effectively prevented.

As shown in FIG. 4, when the chainsaw 1 is viewed from a normal direction of the flat surface (e.g., from above) while being placed on a flat surface, the rotation center 71*o* of the trigger lever body 711 (the center of the rotary shaft 711*c*) overlaps with the power switch 46. With this configuration, the length of the main body portion 10 in the front-rear direction can be designed to be shorter. This contributes to downsizing the chainsaw 1. In addition, it becomes easier for the operator to turn the power switch 46 on and off with the thumb of the hand holding the grip 43.

In particular, in the present embodiment, a distance D1 between the rotation center (the center of the rotary shaft 723) 72*o* of the lockout lever 72 and the center line 46*c* of the power switch 46 is set to be shorter than a distance D2 between the rotation center (the center of the rotary shaft 711*c*) 71*o* of the trigger lever body 711 and the center line 46*c* of the power switch 46. This configuration contributes to further downsizing of the main body portion 10 and, ultimately, the chainsaw 1.

In the main body portion 10 as described above, the main body case 11, the trigger lever 71, the lockout lever 72, and the top handle 40 are preferably made of a relatively hard resin material from the viewpoint of ensuring the mechanical strength of each of them.

Such a relatively hard resin material includes, for example, ABS resin, AS resin, polyamide (nylon), acrylic resin, polycarbonate, polyethylene terephthalate, and the like. One of these resins may be used alone or two or more of them may be used in combination.

In the main body portion 10, the grip 43 can be gripped in one hand, and the power switch 46 can be turned on/off with, for example, the thumb. In addition, the lockout lever 72 can be pressed into with the palm while operating the operation portion 712 with the index finger, and the trigger lever body 711 can be pulled up with the ring finger and/or little finger. That is, in the main body portion 10, it is possible to turn on/off the power switch 46 and rotate (displace) the three members in one hand, providing excellent operability.

The displacement of the lockout lever 72 relative to the trigger lever 71 is not limited to rotation, but it may be sliding in the vertical direction, or the like. The displacement of the operation portion 712 relative to the trigger lever body 711 is not limited to rotation, but it may be sliding in the front-rear direction, or the like.

Furthermore, the working portion that cuts an object may be a cutter assembly in which a pair of cutters is slidably superimposed, a disk having a pruning blade on its periphery, or the like.

Furthermore, the present disclosure may be provided in each of the following aspects.

(1) A working machine, comprising: a working portion configured to cut a work object; and a main body portion connected to the working portion and including a main body case, an operation mechanism and a power switch which are provided in the main body case, wherein: the operation mechanism includes a trigger lever configured to control actuation of the working portion, a lockout lever provided so as to be displaceable relative to the trigger lever, and a restricting portion that restricts a position of the trigger lever relative to the main body case, the trigger lever includes a trigger lever body rotatably attached to the main body case, and an operation portion provided so as to be displaceable relative to the trigger lever body and including a projection portion positioned inside the main body case, when an external force toward the main body case is applied to the trigger lever body that protrudes from the main body case and is in an initial position before the external force is applied, the projection portion of the operation portion comes into contact with the restricting portion and the trigger lever body comes into contact with the lockout lever, so that the trigger lever body is configured to be prevented from rotating relative to the main body case, and when the working machine is viewed from a normal direction of a flat surface while being placed on the flat surface, a rotation center of the trigger lever body overlaps with the power switch.

(2) The working machine according to (1), wherein: the main body case includes a housing space capable of housing the projection portion of the operation portion between the restricting portion and the lockout lever.

(3) The working machine according to (2), wherein: in a state where the lockout lever is brought close to the trigger lever, a part of the lockout lever serves as a guiding portion that guides the projection portion of the operation portion into the housing space.

(4) The working machine according to any one of (1) to (3), wherein: the operation portion is rotatably attached to the trigger lever body.

(5) The working machine according to (4), wherein: the operation portion further includes a finger hook portion that rotate the operation portion relative to the trigger lever body, and an arc-shaped reinforcement portion provided between the finger hook portion and the projection portion, and a portion of the trigger lever body opposite to the reinforcement portion also has an arc shape corresponding to the shape of the reinforcement portion.

(6) The working machine according to (4) or (5), wherein: a surface of the restricting portion on a side of the trigger lever has a curved recessed surface.

(7) The working machine according to any one of (1) to (6), wherein: a top of the projection portion of the operation portion has a curved projected surface.

(8) The working machine according to any one of (1) to (7), wherein: the trigger lever body includes a recessed portion into which a part of the lockout lever is inserted.

(9) The working machine according to any one of (1) to (8), wherein: the lockout lever includes a long lockout lever body, and a contact portion connected to the lockout lever body so as to extend toward the trigger lever.

(10) The working machine according to (9), wherein: the lockout lever is attached to the main body case with a connecting portion between the lockout lever body and the contact portion as a rotation center.

(11) The working machine according to (10), wherein: a distance between the rotation center of the lockout lever and a center line of the power switch is set to be shorter than a distance between the rotation center of the trigger lever body and the center line of the power switch.

Of course, the present disclosure is not limited thereto.

Finally, various embodiments of the present disclosure have been described, but these are presented as examples and are not intended at all to limit the scope of the disclosure. Novel embodiments can be implemented in various other forms, and various omissions, replacements, and modifications can be made within the scope of the spirit of the disclosure. The embodiments and its modifications are included in the scope and the spirit of the disclosure and are included in the scope of the disclosure described in claims and the equivalent scope thereof.

What is claimed is:

1. A working machine, comprising:

a working portion configured to cut a work object; and a main body portion connected to the working portion and including a main body case, an operation mechanism and a power switch which are provided in the main body case, wherein:

the operation mechanism includes a trigger lever configured to control actuation of the working portion, a lockout lever provided so as to be displaceable relative to the trigger lever, and a restricting portion that restricts a position of the trigger lever relative to the main body case, the trigger lever includes a trigger lever body rotatably attached to the main body case, and an operation portion provided so as to be displaceable relative to the trigger lever body and including a projection portion positioned inside the main body case, when an external force toward the main body case is applied to the trigger lever body that protrudes from the main body case and is in an initial position before the external force is applied, the projection portion of the operation portion comes into contact with the restricting portion and the trigger lever body comes into contact with the lockout lever, so that the trigger lever body is configured to be prevented from rotating relative to the main body case, and when the working machine is viewed from a normal direction of a flat surface while being placed on the flat surface, a rotation center of the trigger lever body overlaps with the power switch.

2. The working machine according to claim 1, wherein:

the main body case includes a housing space capable of housing the projection portion of the operation portion between the restricting portion and the lockout lever.

3. The working machine according to claim 2, wherein:

in a state where the lockout lever is brought close to the trigger lever, a part of the lockout lever serves as a guiding portion that guides the projection portion of the operation portion into the housing space.

4. The working machine according to claim 1, wherein:

the operation portion is rotatably attached to the trigger lever body.

5. The working machine according to claim 4, wherein:

the operation portion further includes a finger hook portion that rotate the operation portion relative to the trigger lever body, and an arc-shaped reinforcement portion provided between the finger hook portion and the projection portion, and a portion of the trigger lever body opposite to the reinforcement portion also has an arc shape corresponding to the shape of the reinforcement portion.

6. The working machine according to claim 4, wherein:

a surface of the restricting portion on a side of the trigger lever has a curved recessed surface.

7. The working machine according to claim 1, wherein:

a top of the projection portion of the operation portion has a curved projected surface.

8. The working machine according to claim 1, wherein:

the trigger lever body includes a recessed portion into which a part of the lockout lever is inserted.

9. The working machine according to claim 1, wherein:

the lockout lever includes a long lockout lever body, and a contact portion connected to the lockout lever body so as to extend toward the trigger lever.

10. The working machine according to claim 9, wherein:

the lockout lever is attached to the main body case with a connecting portion between the lockout lever body and the contact portion as a rotation center.

11. The working machine according to claim 10, wherein:

a distance between the rotation center of the lockout lever and a center line of the power switch is set to be shorter than a distance between the rotation center of the trigger lever body and the center line of the power switch.

* * * * *